3,107,255
N-(DIALKYLAMINOALKYL)ANDROSTANYL-17β-AMINES, N-ALKYL DERIVATIVES THEREOF, AND 2,3-DEHYDRO COMPOUNDS CORRESPONDING
Raymond E. Counsell, Skokie, and Paul D. Klimstra, Northbrook, Ill., assignors to G. D. Searle & Co., Chicago, Ill., a corporation of Delaware
No Drawing. Filed Aug. 3, 1962, Ser. No. 214,502
7 Claims. (Cl. 260—397)

The present invention relates to steroidal diamines of the androstane series, characterized further by an unsubstituted A-ring and, more particularly, to N-(dialkylaminoalkyl)androstanyl-17β-amines, the N-alkyl derivatives thereof, and the 2,3-dehydro derivatives corresponding, which substances are represented by the structural formula

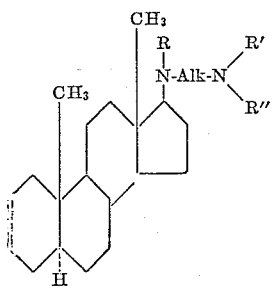

wherein R can be hydrogen or a lower alkyl radical, R' and R" symbolize lower alkyl radicals, Alk is a lower alkylene radical, and the dotted line indicates that the 2,3 carbon to carbon linkage is optionally doubly bonded.

Illustrative of the lower alkyl radicals encompassed by the R, R', and R" terms are methyl, ethyl, propyl, butyl, pentyl, hexyl, and the branched-chain isomers thereof. The lower alkylene radicals designated by Alk are, typically, methylene, ethylene, trimethylene, tetramethylene, pentamethylene, and the corresponding branched-chain groups isomeric therewith.

The compounds of this invention can be manufactured by utilizing as starting materials, 5α-androstan-17-one or 5α-androst-2-en-17-one. The reaction of these substances with a dialkylaminoalkylamine in the presence of an acidic catalyst affords the corresponding 17-imino derivatives, which are allowed to react with a suitable reducing agent, resulting in the N-(dialkylaminoalkyl) compounds of the present invention. These processes are specifically illustrated by the reaction of 5α-androst-2-en-17-one with 3-dimethylaminopropylamine in the presence of p-toluenesulfonic acid to yield N-(3-dimethylaminopropyl)-5α-androst-2-enyl-17-imine, followed by conversion of that imine to N-(3-dimethylaminoethyl)-5α-androst-2-enyl-17β-amine by reaction with lithium aluminum hydride in dioxane. The N-methyl compounds of this invention, on the other hand, are obtained by heating, at the reflux temperature, a mixture of an aforementioned 17-keto starting material with a dialkylaminoalkylamine and formic acid, followed by contacting the resulting N-formyl-N-dialkylaminoalkyl derivative with a suitable reducing agent. Specifically, a mixture of 5α-androstan-17-one, 3-dimethylaminopropylamine, and formic acid is heated at the reflux temperature, affording N-formyl-N-(3-dimethylaminopropyl)-5α-androstanyl-17β-amine, and the latter formamide is reduced with lithium aluminum hydride and dioxane, yielding N-methyl-N-(3-dimethylaminopropyl)-5α-androstanyl-17β-amine.

Those substances of this invention possessing an N-alkyl group of greater than one carbon atom are preferably obtained by acylation of the aforementioned N-(dialkylaminoalkyl) derivatives. Thus, N-(3-dimethylaminopropyl)-5α-androst-2-enyl-17β-amine is converted to N-acetyl-N-(3-dimethylaminopropyl)-5α-androst-2-enyl-17β-amine by reaction with acetic anhydride and pyridine, and that substance is reduced with lithium aluminum hydride and dioxane to afford N-ethyl-N-(3-dimethylaminopropyl)-5α-androst-2-enyl-17β-amine.

An alternate process for producing the 5α-androstanyl compounds of the present invention involves hydrogenation of the corresponding 5α-androst-2-enyl substances. For example, the aforementioned N-(3-dimethylaminopropyl)-5α-androst-2-enyl-17β-amine is shaken in ethanol solution with a platinum or palladium hydrogenation catalyst in an atmosphere of hydrogen to afford N-(3-dimethylaminopropyl)-5α-androstanyl-17β-amine.

Equivalent to the instant amines for the purposes of this invention are the corresponding non-toxic acid and quaternary salts, which are exemplified by the citrate, tartrate, maleate, ascorbate, gluconate, lactate, succinate, phosphate, sulfate, hydrobromide, hydrochloride, methiodide, ethiodide, methochloride, methobromide, methosulfate, and ethosulfate.

The compounds of this invention display valuable pharmacological properties. They are, for example, hypocholesterolemic agents as is evidenced by their ability to inhibit hepatic cholesteral synthesis. In addition, they are anti-biotic agents in view of their ability to inhibit the growth of such organisms as *Diplococcus pneumoniae* and *Chlorella vulgaris* and the ability also to inhibit monocotyledenous and dicotyledenous seed germination.

The invention is illustrated more fully by the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a solution of 40 parts of 5α-androst-2-en-17-one and 30 parts of 3-dimethylaminopropylamine in 440 parts of benzene is added 3 parts of p-toluenesulfonic acid monohydrate, and this reaction mixture is heated at the reflux temperature for about 4 hours with concomitant removal of the water formed in the reaction. The solution is then cooled to room temperature, washed with water, dried over anhydrous sodium sulfate containing decolorizing carbon, and stripped of solvent at reduced pressure to afford an oily residue. This oil is dissolved in ether, to which solution is added an equivalent quantity of isopropanolic hydrogen chloride. The resulting precipitate is collected by filtration and washed on the filter with pentane, then dried to afford N-(3-dimethylaminopropyl)-androst-2-enyl-17-imine dihydrochloride, characterized by an optical rotation of +58.5° in chloroform and by the structural formula

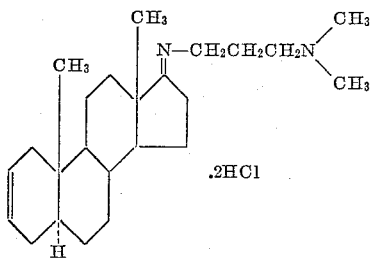

Example 2

To a mixture of 12 parts of lithium aluminum hydride with 400 parts of dioxane is added, under nitrogen with stirring, a solution of 50 parts of N-(3-dimethylaminopropyl)-5α-androst-2-enyl-17-imine in 450 parts of dioxane over a period of about 2 hours. The resulting reaction mixture is heated at the reflux temperature for about 16 hours, then is cooled and is treated successively with an aqueous solution of 50 parts of dioxane in 12 parts of water, 9 parts by volume of 20% aqueous sodium hydroxide, and 41 parts of water. The resulting precipitated salts are removed by filtration and washed on the filter with hot dioxane. The filtrate is subjected to distillation to remove the solvent, and the residual viscous oil gradually solidifies on standing to afford N-(3-dimethylaminopropyl)-5α-androst-2-enyl-17β-amine, melting at about 50° and displaying an optical rotation of +63.5° in chloroform. This substance is represented by the structural formula

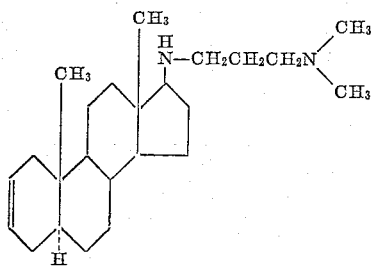

To a solution of the latter amine in acetone is added isopropanolic hydrogen chloride, and the resulting precipitate is collected by filtration, then dried to yield N-(3-dimethylaminopropyl)-5α-androst-2-enyl-17β-amine dihydrochloride. It is characterized by an optical rotation of +51° in methanol.

Example 3

To a mixture of 20 parts of 5α-androst-2-en-17-one in 73 parts of formic acid is added cautiously with stirring 40 parts of 3-dimethylaminopropylamine, and the resulting solution is heated at 170–180° for about 20 hours. This reaction mixture is cooled, then is made alkaline by the addition of 500 parts of an aqueous solution containing 60 parts of sodium hydroxide. The resulting precipitate is collected by filtration and washed with water, then is extracted with chloroform. The chloroform extract is washed with water, dried over anhydrous potassium carbonate containing decolorizing carbon, then is stripped of solvent, resulting in N-formyl-N-(3-dimethylaminopropyl)-5α-androst-2-enyl-17β-amine, obtained as an oil.

Example 4

To a refluxing mixture of 7.5 parts of lithium aluminum hydride in 200 parts of dioxane is added, in an atmosphere of nitrogen, with stirring, a solution of 15 parts of N-(3-dimethylaminopropyl)-N-formyl-5α-androst-2-enyl-17β-amine in 200 parts of dioxane over a period of about 1¾ hours. Heating at the reflux temperature is continued for about 20 hours longer, at the end of which time the mixture is cooled, then is treated successively with a solution of 7.5 parts of water in 25 parts of dioxane, 5.6 parts by volume of 20% aqueous sodium hydroxide, and 26 parts of water. The precipitated salts are removed by filtration and washed on the filter with dioxane. Removal of the solvent by distillation at reduced pressure affords the solid product, N-methyl-N-(3-dimethylaminopropyl)-5α-androst-2-enyl-17β-amine. This compound is represented by the structural formula

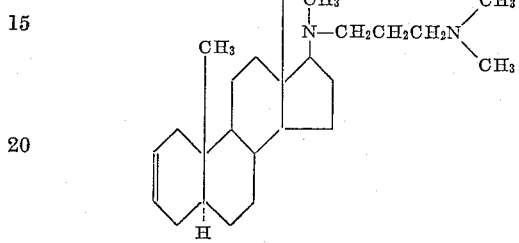

A solution of the latter free base in ether is treated with isopropanolic hydrogen chloride, and the precipitated solid is collected by filtration and dried to afford the dihydrochloride salt, characterized by an optical rotation of +42° in chloroform.

Example 5

To a solution of 15 parts of 5α-androstan-17-one in 36.6 parts of formic acid is added, portionwise over a period of about 10 minutes, 30 parts of 3-dimethylaminopropylamine. This reaction mixture is heated at reflux with stirring for about 29½ hours, then is cooled and poured into a solution of 20 parts of sodium hydroxide in 600 parts of water. The precipitate which forms is collected by filtration, washed on the filter with water, and partially dried in air. Extraction with acetone affords a solution, which is diluted with ethyl acetate, then is washed with water and dried over anhydrous potassium carbonate containing decolorizing carbon. Removal of the solvent by distillation affords a semi-solid residue of N-formyl-N-(3-dimethylaminopropyl)-5α-androstanyl-17β-amine. This substance is characterized by the structural formula

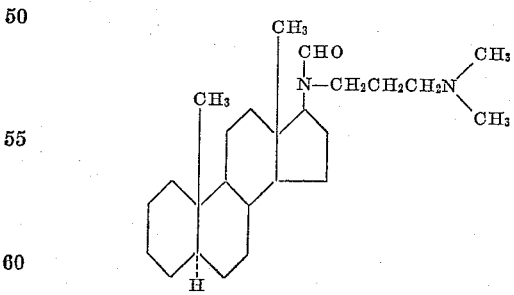

Example 6

To a mixture of 6.5 parts of lithium aluminum hydride in 150 parts of dioxane is added, with stirring over a period of about 45 minutes, a solution of 13 parts of N-formyl-N-(3-dimethylaminopropyl)-5α-androstanyl-17β-amine in 150 parts of dioxane. This reaction mixture is heated at the reflux temperature for about 17 hours, then is cooled and treated successively with a solution of 7 parts of water in 30 parts of dioxane, 6 parts by volume of 20% aqueous sodium hydroxide, and 25 parts of water. The resulting precipitated solids are collected by filtration and washed on the filter with hot dioxane. Removal of the solvent from the filtrate by distillation at reduced pressure affords an oil. A solution of the latter oily product in acetone is mixed with isopropanolic hydrogen chloride, and the resulting solid is isolated by filtration, then dried to afford N-methyl-N-(3-dimethylaminopropyl)-5α-androstanyl-17β-amine dihydrochloride, which substance is characterized by an optical rotation of +21.5° in methanol.

*Example 7*

To a solution of N-methyl-N-(3-dimethylaminopropyl)-5α-androstanyl-17β-amine dihydrochloride in 5% aqueous ethanol is added 5% aqueous sodium carbonate until precipitation ceases. This precipitate is extracted into chloroform, and the organic solution is washed with water, dried over anhydrous potassium carbonate containing decolorizing carbon, and stripped of solvent at reduced pressure to afford an oil which solidifies on standing. This substance is N-methyl-N-(3-dimethylaminopropyl)-5α-androstanyl-17β-amine, melting at about 37–40° and characterized further by an optical rotation of +11.5° in chloroform. This substance is represented by the structural formula

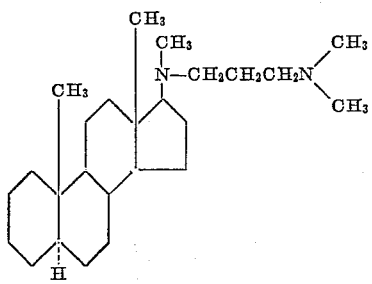

*Example 8*

The substitution of 45.5 parts of 2-diethylaminoethylamine in the procedure of Example 3 results in N-formyl-N-(2-diethylaminoethyl)-5α-androst-2-enyl-17β-amine.

*Example 9*

By substituting 15.5 parts of N-formyl-N-(2-diethylaminoethyl)-5α-androst-2-enyl-17β-amine and otherwise proceeding according to the processes described in Example 4, N-methyl-N-(2-diethylaminoethyl)-5α-androst-2-enyl-17β-amine is obtained. This compound is represented by the structural formula

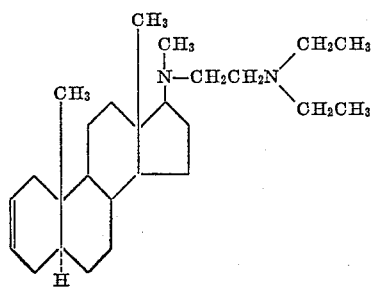

*Example 10*

By substituting 34.1 parts of 2-diethylaminoethylamine and otherwise proceeding according to the procedure described in Example 5, N-formyl-N-(2-diethylaminoethyl)-5α-androstanyl-17β-amine is obtained.

*Example 11*

By substituting 13.5 parts of N-formyl-N-(2-diethylaminoethyl)-5α-androstanyl-17β-amine and otherwise proceeding according to the procedure described in Example 6, N-methyl-N-(2-diethylaminoethyl)-5α-androstanyl-17β-amine of the structural formula

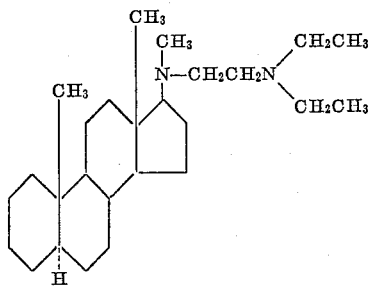

is obtained.

What is claimed is:

1. A compound of the structural formula

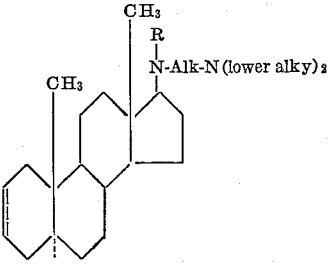

wherein R is selected from the group consisting of hydrogen and the methyl radical, Alk is a lower alkylene radical, and the dotted line indicates the optional presence of a double bond between carbon atoms 2 and 3.

2. N-(3-dimethylaminopropyl)-5α-androst-2-enyl-17β-amine.

3. A compound of the structural formula

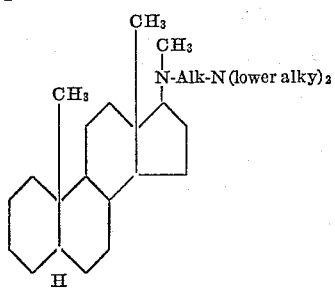

wherein Alk is a lower alkylene radical.

4. N-methyl-N-(3-dimethylaminopropyl)-5α-androstanyl-17β-amine.

5. A compound of the formula

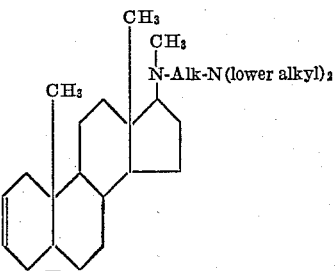

wherein Alk is a lower alkylene radical.

6. N-methyl-N-(3-dimethylaminopropyl)-5α-androst-2-enyl-17β-amine.

7. N-(3-dimethylaminopropyl)-5α-androst-2-enyl-17-imine.

No references cited.